US008762753B2

(12) United States Patent
Abhishek et al.

(10) Patent No.: US 8,762,753 B2
(45) Date of Patent: Jun. 24, 2014

(54) POWER MANAGEMENT CIRCUIT USING TWO CONFIGURATION SIGNALS TO CONTROL THE POWER MODES OF TWO CIRCUIT MODULES USING TWO CROSSLINKED MULTIPLEXERS AND A LEVEL SHIFTER

(75) Inventors: Kumar Abhishek, Ghaziabad (IN); Manmohan Rana, Ghaziabad (IN); Samaksh Sinha, Singapore (SG)

(73) Assignee: Freescale Semiconductor, Inc., Austin, TX (US)

( * ) Notice: Subject to any disclaimer, the term of this patent is extended or adjusted under 35 U.S.C. 154(b) by 251 days.

(21) Appl. No.: 13/525,347

(22) Filed: Jun. 17, 2012

(65) Prior Publication Data

US 2013/0339761 A1 Dec. 19, 2013

(51) Int. Cl.
*G06F 1/26* (2006.01)
*G06F 1/32* (2006.01)

(52) U.S. Cl.
CPC .................................. *G06F 1/3287* (2013.01)
USPC ........... 713/320; 713/300; 713/323; 713/324; 713/330

(58) Field of Classification Search
CPC ....... G06F 1/32; G06F 1/3206; G06F 1/3234; G06F 1/3243; G06F 1/3287
USPC ......................................... 713/300, 320, 323
See application file for complete search history.

(56) References Cited

U.S. PATENT DOCUMENTS

| 5,256,943 | A | * | 10/1993 | German .......................... 318/685 |
| 5,457,409 | A | * | 10/1995 | Agrawal et al. ................... 326/39 |
| 5,511,181 | A | * | 4/1996 | Baxter .......................... 713/400 |
| 5,551,017 | A | * | 8/1996 | Baxter .......................... 713/401 |
| 5,583,452 | A | * | 12/1996 | Duong et al. .................... 326/49 |
| 5,811,986 | A | * | 9/1998 | Agrawal et al. .................. 326/39 |
| 5,883,852 | A | * | 3/1999 | Ghia et al. ................ 365/230.05 |
| 6,192,431 | B1 | * | 2/2001 | Dabral et al. .................... 710/62 |
| 6,421,754 | B1 | * | 7/2002 | Kau et al. ....................... 710/261 |
| 6,586,911 | B1 | * | 7/2003 | Smith et al. .................... 320/134 |
| 6,732,214 | B1 | * | 5/2004 | Cohen et al. .................... 710/305 |
| 6,907,374 | B1 | * | 6/2005 | Tsyrganovich ............... 702/107 |
| 7,088,318 | B2 | * | 8/2006 | Malmberg ....................... 345/77 |
| 7,276,935 | B1 | * | 10/2007 | Camarota ....................... 326/38 |
| 7,477,073 | B1 | * | 1/2009 | Tuan et al. ...................... 326/41 |
| 8,004,352 | B1 | * | 8/2011 | Wang et al. .................... 327/544 |
| 8,015,426 | B2 | | 9/2011 | VanStee et al. |
| 8,018,247 | B2 | * | 9/2011 | Priel et al. ....................... 326/34 |
| 8,448,001 | B1 | * | 5/2013 | Zhu et al. ....................... 713/322 |
| 2002/0147898 | A1 | * | 10/2002 | Rentschler et al. ............. 711/170 |
| 2004/0141531 | A1 | * | 7/2004 | Amirichimeh et al. ........ 370/535 |
| 2006/0087247 | A1 | * | 4/2006 | Malmberg ................. 315/169.2 |
| 2008/0204124 | A1 | * | 8/2008 | Chakraborty et al. ......... 327/544 |
| 2009/0041060 | A1 | * | 2/2009 | Amirichimeh et al. ........ 370/535 |

(Continued)

*Primary Examiner* — Thomas Lee
*Assistant Examiner* — David N Penick
(74) *Attorney, Agent, or Firm* — Charles Bergere

(57) ABSTRACT

A power management circuit for managing power supplied to an electronic circuit by a core power supply. The electronic circuit includes digital and analog circuit domains and operates in POWER-ON, RUN and STANDBY modes. The power management circuit includes a master state machine that exchanges a handshake signal with the analog circuit domain to monitor the modes of operation and generates first and second configuration signals. The power management circuit enables and disables the analog circuit domain based on the first and second configuration signals. A switch connected to the core power supply and the digital circuit module enables and disables the digital circuit domain based on the second configuration signal.

16 Claims, 3 Drawing Sheets

(56) References Cited

U.S. PATENT DOCUMENTS

| | | | |
|---|---|---|---|
| 2009/0189640 A1* | 7/2009 | Seto | 326/81 |
| 2009/0261862 A1* | 10/2009 | Nguyen et al. | 327/73 |
| 2010/0042858 A1* | 2/2010 | Padhye et al. | 713/323 |
| 2012/0032823 A1* | 2/2012 | Hana et al. | 341/51 |
| 2012/0275236 A1* | 11/2012 | Hess et al. | 365/189.02 |
| 2013/0026833 A1* | 1/2013 | Huang | 307/48 |
| 2014/0078815 A1* | 3/2014 | Hollis | 365/149 |

* cited by examiner

POWER MANAGEMENT CIRCUIT USING TWO CONFIGURATION SIGNALS TO CONTROL THE POWER MODES OF TWO CIRCUIT MODULES USING TWO CROSSLINKED MULTIPLEXERS AND A LEVEL SHIFTER

BACKGROUND OF THE INVENTION

The present invention relates generally to electronic circuits, and more particularly, to power management in electronic circuits.

Electronic circuits such as microprocessors, microcontroller units (MCUs), system-on-chips (SOCs), and application specific integrated circuits (ASICs) are widely used in applications including industrial applications, automobiles, home appliances, and handheld devices and often operate in different power modes including RUN, STANDBY and POWER-ON modes. An example of a conventional electronic circuit 100 is illustrated in FIG. 1. The electronic circuit 100 includes a core power supply 102, a power management circuit 104, and digital and analog circuit domains 106 and 108. The power management circuit 104 includes a master state machine 110. The digital circuit domain 106 includes a plurality of digital circuit modules including first and second digital circuit modules 112a and 112b (collectively referred to as digital circuit modules 112) and a plurality of digital state machines including first and second digital state machines 114a and 114b (collectively referred to as digital state machines 114). Similarly, the analog circuit domain 108 includes a plurality of analog circuit modules including first and second analog circuit modules 116a and 116b (collectively referred to as analog circuit modules 116). Examples of analog circuit modules 116 include low drop-out voltage regulators, universal serial bus (USB) ports, and double data rate, random access memories (DDR-RAMs).

The power management circuit 104 is connected to the core power supply 102, and the digital and analog circuit domains 106 and 108 and provides an appropriate voltage supply there circuit domains 106, 108. Each analog circuit module 116 has a corresponding digital state machine 114 to configure the mode of operation of the analog circuit module 116. The master state machine 110 provides control signals to the digital state machines 114, based on which the digital state machines 114 generate a configuration signal to configure the mode of operation of the corresponding analog circuit modules 116.

In the RUN mode, both the digital and analog circuit domains 106 and 108 receive a predefined voltage from the core power supply 102. In the STANDBY mode, the digital circuit domain 106 receives the predefined voltage and stays in an "always ON" state, while the analog circuit domain 108 is switched off. The POWER-ON mode is common to both the digital and analog circuit domains 106 and 108, in which the power management circuit 104 provides a predetermined threshold voltage to activate (or wake up) the digital and analog circuit domains 106 and 108.

The digital state machines 114 configure the mode of operation of corresponding analog circuit modules 116 and require a constant voltage supply and are maintained in an "always ON" state. For example, the power management circuit 104 provides a constant supply of 1.2V to the digital circuit domain 106 to configure the analog circuit modules 116 throughout the various modes of operation, which increases the power consumption of the electronic circuit 100. An increase in the number of analog circuit modules 116 requires a corresponding increase in the number of digital state machines 114, which further contributes to the increased power consumption of the electronic circuit 100.

In addition, each digital state machine 114 has an undesired leakage current. As the number of digital state machines 114 increases, the leakage current of the digital circuit domain 106 increase. An increase in the power consumption and current loss results in an increase in the overall operating cost of the electronic circuit 100. Moreover, an increase in the number of digital state machines 114 increases the size of the electronic circuit 100.

It would be advantageous to have an electronic circuit that has reduced current loss and power consumption across various operating modes, reduced size, and that overcomes the above-mentioned disadvantages of conventional electronic circuits.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

Figure 1:
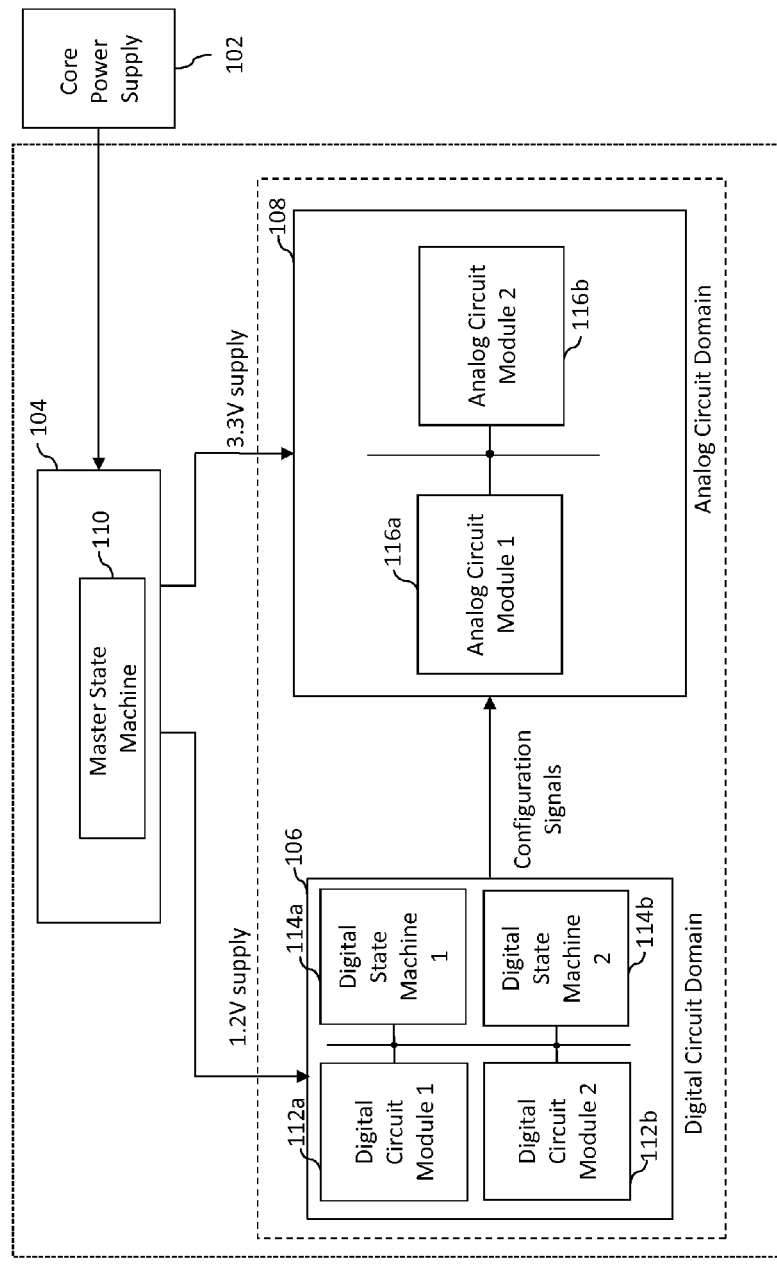
FIG. 1 is a schematic block diagram of a conventional electronic circuit.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. In the description, the term multiplexer has been abbreviated as mux.

In an embodiment of the present invention, a power management circuit is provided. The power management circuit manages power supplied to an electronic circuit by a core power supply. The electronic circuit includes analog and digital circuit modules and operates in POWER-ON, RUN and STANDBY modes. The power management circuit includes a master state machine that generates first and second configuration signals. A switch is connected to the core power supply and the digital circuit module. The switch enables the digital circuit module to receive a first voltage from the core power supply when the electronic circuit operates in the RUN and POWER-ON modes and disables the digital circuit module when the electronic circuit is in the STANDBY mode. A first logic circuit is connected to the master state machine and receives the first and second configuration signals and generates a control signal. A first mux has a select terminal that is connected to the first logic circuit, a first input terminal receives a second voltage by way of an inverted second configuration signal and a second input terminal that receives a predetermined voltage. The first mux generates a first output signal. A second mux has a select terminal connected to the first logic circuit, a first input terminal that receives the predetermined voltage, and a second input terminal that receives the second voltage by way of the inverted second configuration signal. The second mux generates a second output signal. The power management circuit further includes a level shifter having first and second input terminals for receiving the first and second output signals respectively, and an enable terminal for receiving the first voltage. The level shifter provides the second voltage to the analog circuit module when the electronic circuit is in the POWER-ON and RUN modes and disables the analog circuit module when the electronic circuit is in the STANDBY mode.

In another embodiment of the present invention, an electronic circuit is provided. The electronic circuit includes an analog circuit module and a digital circuit module. A master state machine generates first and second configuration signals. A switch is connected to a core power supply and the digital circuit module. The switch enables the digital circuit module to receive a first voltage from the core power supply when the electronic circuit operates in RUN and POWER-ON modes and disables the digital circuit module when the electronic circuit is in a STANDBY mode. A first logic circuit is connected to the master state machine and receives the first and second configuration signals and generates a control signal. A first mux has a select terminal that is connected to the first logic circuit, a first input terminal receives a second voltage by way of an inverted second configuration signal and a second input terminal that receives a predetermined voltage. The first mux generates a first output signal. A second mux has a select terminal connected to the first logic circuit, a first input terminal that receives the predetermined voltage, and a second input terminal that receives the second voltage by way of the inverted second configuration signal. The second mux generates a second output signal. The power management circuit further includes a level shifter having first and second input terminals for receiving the first and second output signals respectively, and an enable terminal for receiving the first voltage. The level shifter provides the second voltage to the analog circuit module when the electronic circuit is in the POWER-ON and RUN modes and disables the analog circuit module when the electronic circuit is in the STANDBY mode.

Various embodiments of the present invention provide an electronic circuit that is capable of operating in POWER_ON, RUN and STANDBY modes. The electronic circuit includes digital and analog circuit domains and a power management circuit. The power management circuit includes a switch to control the supply of a first voltage to the digital circuit domain. The switch is switched ON when the electronic circuit is in the POWER_ON and RUN modes and ensures supply of the first voltage to the digital circuit domain. The switch is switched OFF when the electronic circuit transitions from the RUN mode to a STANDBY mode and the digital circuit domain is disabled. As the digital circuit domain remains disabled in the STANDBY mode, the power consumption of the electronic circuit is reduced. The power management circuit further provides a second voltage to the analog circuit domain when the electronic circuit is in the POWER-ON and RUN modes and disables the analog circuit domain when the electronic circuit is in the STANDBY mode. As the power management circuit is capable of configuring the supply of the second voltage to the analog circuit domain, digital state machines are not required and the size and cost of the electronic circuit is reduced. Also, the leakage currents contributed by the digital state machines are eliminated, thereby eliminating current losses of the electronic circuit.

Figure 2:
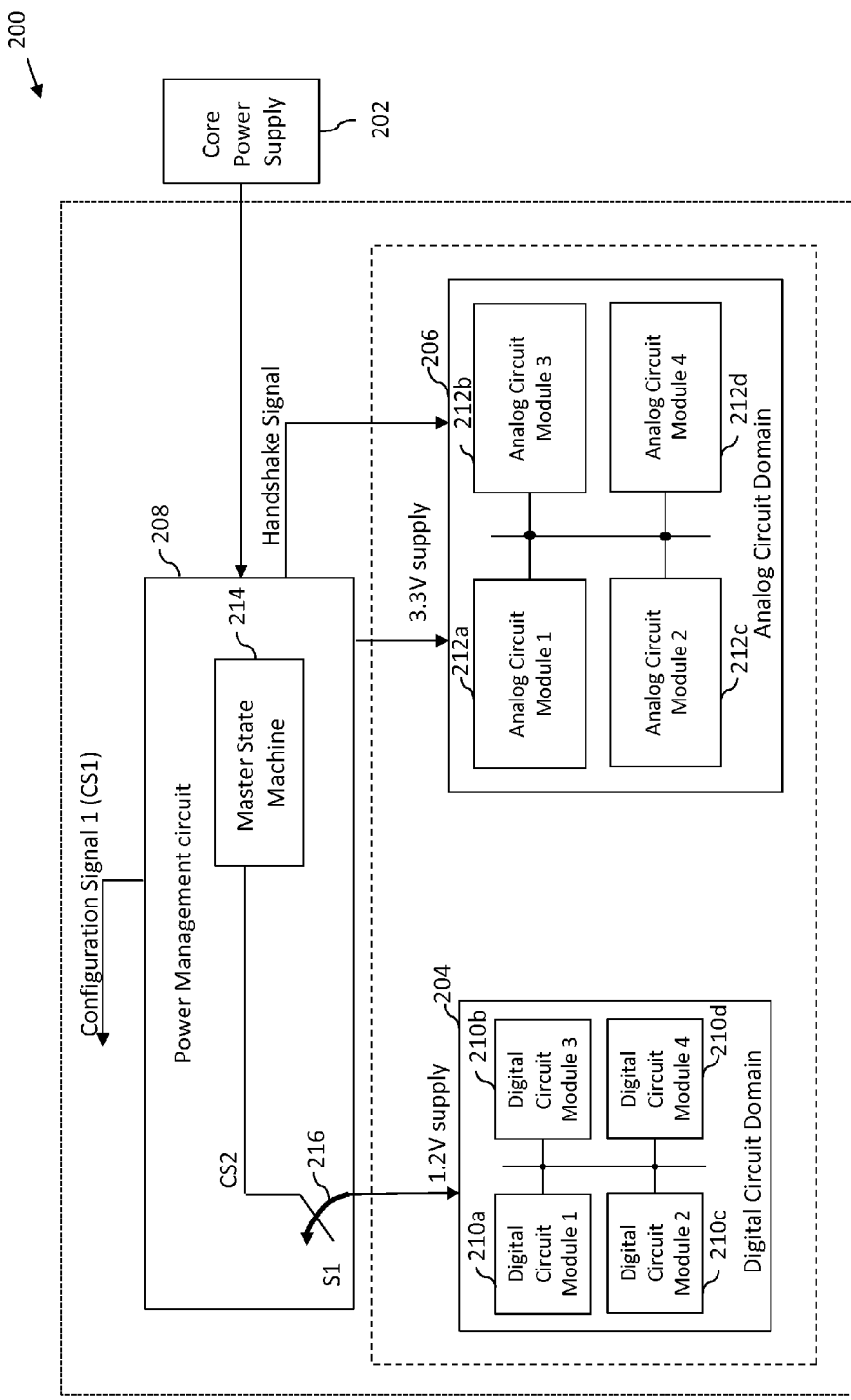
FIG. 2 is a schematic block diagram of an electronic circuit in accordance with an embodiment of the present invention.

Referring now to FIG. 2, a schematic diagram of an electronic circuit 200, in accordance with an embodiment of the present invention, is shown. Examples of the electronic circuit 200 include microprocessors, microcontrollers, systems-on-chips (SoCs), application specific integrated circuits (ASICs), and the like. The electronic circuit 200 is connected to a core power supply 202 and includes digital and analog circuit domains 204 and 206, and a power management circuit 208.

The digital circuit domain 204 includes a plurality of digital circuit modules including first through fourth digital circuit modules 210a-210d (collectively referred to as digital circuit modules 210) and the analog circuit domain 206 includes a plurality of analog circuit modules including first through fourth analog circuit modules 212a-212d (collectively referred to as analog circuit modules 212). In various embodiments of the present invention, the digital circuit modules 210 may include digital logic circuits that perform register read/write operations on the analog circuit modules 212, manage interrupts and data acquisition. The analog circuit modules 212 may include low drop-out regulators, universal serial bus (USB) ports and double data rate, random access memories (DDR-RAMS).

The power management circuit 208 is connected to the core power supply 202 and includes a master state machine 214 that regulates supply of power to the digital and analog circuit domains 204 and 206. In an embodiment of the present invention, the power management circuit 208 may include a voltage regulator (not shown) that regulates voltage received from the core power supply 202 based on a voltage control signal generated by the master state machine 214 and provides the regulated voltage to the digital and analog circuit domains 204 and 206. For example, if the core power supply 202 generates a 3.3V supply, the voltage regulator regulates the 3.3V supply and generates a 1.2V supply, which is provided to the digital circuit domain 204. In another embodiment of the present invention, the master state machine 214 is implemented in a memory device (not shown).

The digital and analog circuit domains 204 and 206 receive first and second voltages, respectively, from the core power supply 202, based on the modes of operation (POWER-ON, STANDBY and RUN modes) of the electronic circuit 200. In various embodiments of the present invention, the digital circuit domain 204 is configured to receive the first voltage during the POWER-ON and RUN modes and is disabled during the STANDBY mode. The analog circuit domain 206 is configured to receive the second voltage during the POWER-ON and RUN modes and is disabled during the STANDBY mode. In an exemplary embodiment of the present invention, the first voltage is 1.2V and the second voltage is 3.3V. The master state machine 214 generates first and second configuration signals (CS1 and CS2) that are used to regulate the supply of the first and second voltages to the digital and analog circuit domains 204 and 206, respectively. The power management circuit 208 may include power supply threshold circuits (not shown) that generate the first and second configuration signals CS1 and CS2. In an embodiment of the present invention, the master state machine 214 exchanges a handshake signal with the analog circuit domain 206 to monitor the modes of operation thereof and accordingly generates the first and second configuration signals CS1 and CS2.

Figure 3:
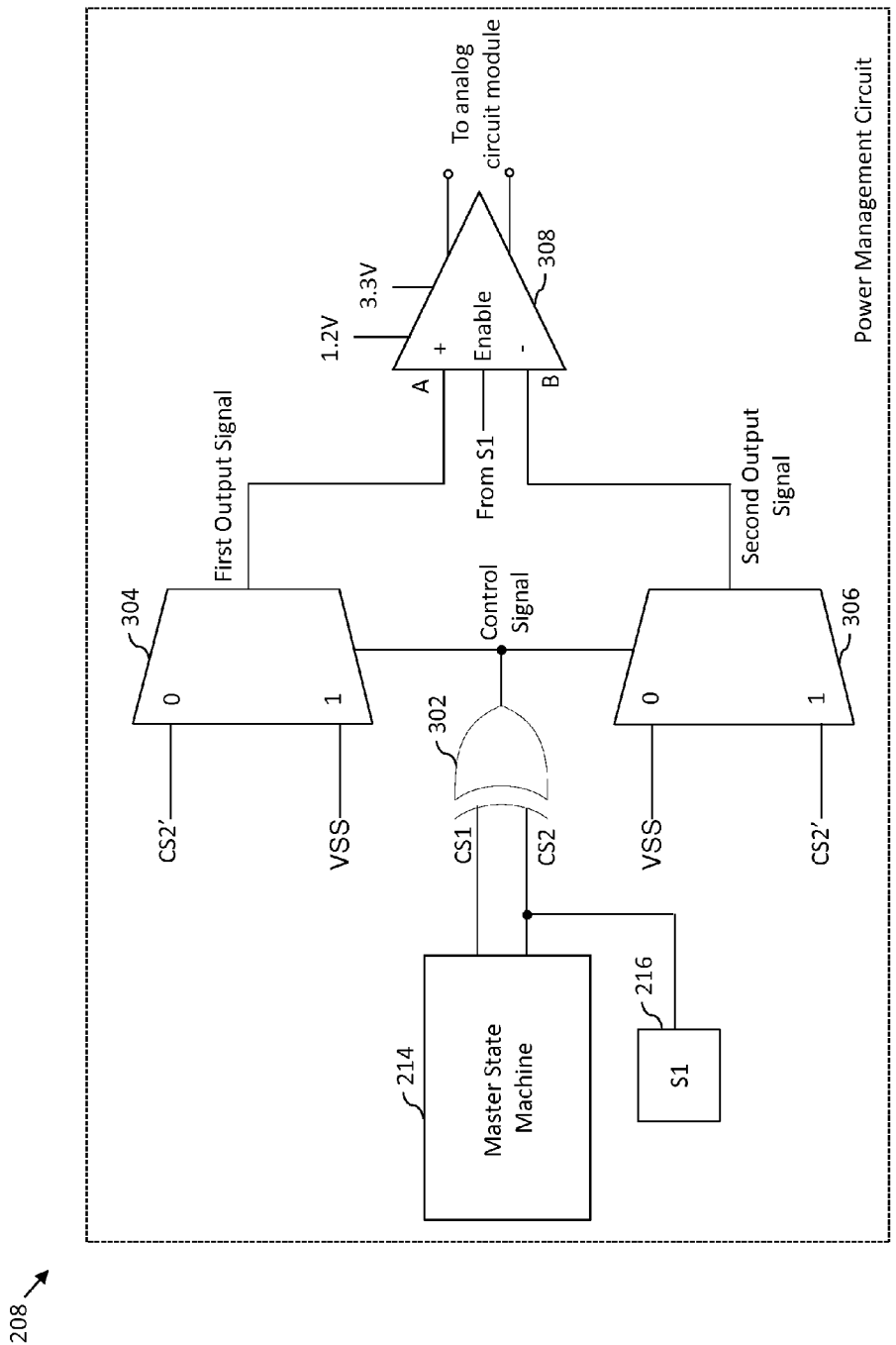
FIG. 3 is a schematic circuit diagram of a power management circuit in accordance with an embodiment of the present invention.

Referring now to FIG. 3, a schematic circuit diagram of the power management circuit 208, in accordance with an embodiment of the present invention, is shown. In addition to the master state machine 214, the power management circuit 208 includes the switch 216, an XOR gate 302, first and second muxes 304 and 306, and a level shifter 308.

The switch 216 is connected between the core power supply 202 and the digital circuit domain 204 and the switching thereof is controlled by the second configuration signal CS2. First and second input terminals of the XOR gate 302 are connected to the master state machine 214 and receive the first and second configuration signals CS1 and CS2, respectively. Select terminals of the first and second muxes 304 and 306 are connected to an output terminal of the XOR gate 302 and receive an output signal (or a control signal) generated thereby. The master state machine 214 generates a second voltage, which is provided as an input to the first and second terminals of the first and second muxes 304 and 306, respectively, by way of an inverted second configuration signal (CS2'). A second input terminal of the first mux 304 receives a predetermined voltage and an output terminal thereof generates a first output signal. A first input terminal of the second mux 306 also receives the predetermined voltage. An output terminal of the second mux 306 generates a second output signal. In an embodiment of the present invention, the predetermined voltage is zero, i.e., the second and first input terminals of the first and second muxes 304 and 306 are grounded. First and second input terminals of the level shifter 308 are connected to the output terminals of the first and second muxes 304 and 306 and receive the first and second output signals, respectively. An output terminal of the level shifter 308 selectively provides the second voltage to the analog circuit domain 206, based on the mode of operation of the electronic circuit 200.

In various embodiments of the present invention, the master state machine 214 programs the states of the first and second configuration signals CS1 and CS2 based on the mode of operation of the electronic circuit 200. The power management circuit 208 may include first and second power supply threshold circuits (not shown) that generate voltages corresponding to the first and second configuration signals CS1 and CS2. An exemplary truth table illustrating the states of the first and second configuration signals CS1 and CS2 across different modes of operation of the electronic circuit 200 has been shown in TABLE A below:

TABLE A

| Mode of operation | CS1 | CS2 |
|---|---|---|
| POWER-UP | 0 | 0 |
| POWER-ON | 1 | 1 |
| STANDBY_ENTRY | 1 | 0 |
| STANDBY_AWAKE | 1 | 1 |

Before the electronic circuit 200 enters the POWER-ON mode, it is powered up (i.e., POWER-UP mode is initiated) in which the master state machine 214 programs both the first and second configuration signals CS1 and CS2 to a logic low state, as shown in TABLE A. The XOR gate 302 receives the logic low first and second configuration signals at first and second input terminals thereof, that causes the output thereof, i.e., the control signal, to switch to a low state. The logic low control signal is provided to the select terminals of the first and second muxes 304 and 306 and causes the output of the first mux 304 (i.e., the first output signal) to switch to a logic high state and the output of the second mux 306 (i.e., the second output signal) to switch to a logic low state. The corresponding logic high and low states of the first and second output signals cause the level shifter 308 to generate the second voltage, which is supplied to the analog circuit domain 206 and the electronic circuit 200 begins transition from the POWER-UP mode to the POWER-ON mode.

During the transition from the POWER-UP mode to the POWER-ON mode, the master state machine 214 programs both the first and second configuration signals CS1 and CS2 to a logic high state, as shown in TABLE A (for example, 1.2V or 3.3V). The high state of the second configuration signal CS2 causes the switch 216 to switch ON, thereby causing the digital circuit domain 204 to transition to the RUN mode. The XOR gate 302 receives the logic high first and second configuration signals at first and second input terminals thereof, that causes the control signal, to switch to a logic low state. The logic low control signal is provided to the select terminals of the first and second muxes 304 and 306. Since the electronic circuit 200 transitions from POWER-UP mode to the POWER-ON mode, the first and second input terminals of the first and second muxes 304 and 306 respectively receive the second voltage (i.e., the inverted second configuration signal CS2') and the second and first input terminals of the first and second muxes 304 and 306 are respectively grounded. Therefore, the output of the first and second muxes 304 and 306 remains in logic low state, which enables the level shifter 308 to receive an input at an enable input terminal thereof. Since the switch 216 is ON (due to the logic high second configuration signal CS2), the first voltage is provided at the enable input terminal by way of the switch 216, which enables the level shifter 308. Based on the first voltage, the level shifter 308 generates a level shifted output i.e., the second voltage, which enables the analog circuit domain 206 and the electronic circuit 200 completes transition from the POWER-UP mode to the POWER-ON mode. Thereafter, the digital and analog circuit domains 204 and 206 get activated and the electronic circuit 200 transitions from POWER-ON mode to RUN mode.

The STANDBY mode operation has two sub-modes: STANDBY_ENTRY and STANDBY_AWAKE modes. The STANDBY_ENTRY mode is triggered when the electronic circuit 200 transitions from the RUN mode to the STANDBY mode. During the STANDBY_ENTRY mode, the master state machine 214 programs the first and second configuration signals CS1 and CS2 to logic high and low states respectively (as shown in the TABLE A). The low state of the second configuration signal CS2 causes the switch 216 to switch OFF and the first supply voltage to the digital circuit domain 204 is disabled. The XOR gate 302 receives the logic high and low first and second configuration signals at first and second input terminals thereof, causing the output thereof, i.e., the control signal to switch to a high state. The logic high control signal is provided to the select terminals of the first and second muxes 304 and 306 and causes the output of the first mux 304 (i.e., the first output signal) to switch to a logic low state and the output of the second mux 306 (i.e., the second output signal) to switch to a logic high state. The corresponding logic low and high states of the first and second output signals cause the level shifter 308 to generate zero voltage and disable the analog circuit domain 206, thereby configuring the electronic circuit 200 in the STANDBY mode. The digital circuit domain 204 remains switched OFF in the STANDBY mode and the power consumption of the electronic circuit 200 is reduced.

During the STANDBY_AWAKE mode, the master state machine 214 programs the first and second configuration signals CS1 and CS2 to logic high states. The high state of the second configuration signal CS2 causes the switch 216 to switch ON, thereby causing the digital circuit domain 204 to transition to the RUN mode. The XOR gate 302 receives the logic high first and second configuration signals CS1 and CS2 at first and second input terminals thereof, causing the output of thereof, i.e., the control signal, to switch to a logic low state. The logic low control signal is provided to the select terminals of the first and second muxes 304 and 306. Since the electronic circuit 200 transitions from STANDBY_ENTRY to STANDBY_AWAKE mode, the first and second input terminals of the first and second muxes 304 and 306 respectively receive the second voltage (i.e., the inverted second configuration signal CS2') and the second and first input terminals of the first and second muxes 304 and 306 respectively are grounded. Therefore, the outputs of the first and second muxes 304 and 306 remain in logic low states, which enables the level shifter 308 to receive an input at an enable input terminal thereof. Since the switch 216 is ON, the first voltage is provided at the enable input terminal by way of the switch 216, which enables the level shifter 308. Based on the first voltage, the level shifter 308 generates a level shifted output i.e., the second voltage, which is required to enable the analog circuit domain 206. The second voltage activates the analog circuit domain 206 and completes the transition of the electronic circuit 200 from the STANDBY mode to the RUN mode.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A power management circuit for managing power supplied to an electronic circuit by a core power supply, wherein the electronic circuit includes analog and digital circuit modules and operates in POWER-ON, RUN and STANDBY modes, the power management circuit comprising:
   a master state machine for generating first and second configuration signals;
   a switch connected to the core power supply and the digital circuit module, to enable the digital circuit module for receiving a first voltage from the core power supply when the electronic circuit is in the RUN and POWER-ON modes and disable the digital circuit module when the electronic circuit is in the STANDBY mode;
   a first logic circuit, connected to the master state machine, for receiving the first and second configuration signals and generating a control signal;
   a first multiplexer, having a select terminal connected to the first logic circuit, a first input terminal that receives a second voltage by way of an inverted second configuration signal and a second input terminal that receives a predetermined voltage, wherein the first multiplexer generates a first output signal;
   a second multiplexer, having a select terminal connected to the first logic circuit, a first input terminal that receives the predetermined voltage, and a second input terminal that receives the second voltage by way of the inverted second configuration signal, wherein the second multiplexer generates a second output signal; and
   a level shifter having first and second input terminals for receiving the first and second output signals respectively, and an enable terminal for receiving the first voltage,
   wherein the level shifter provides the second voltage to the analog circuit module, when the electronic circuit is in the POWER-ON and RUN modes and disables the analog circuit module, when the electronic circuit is in the STANDBY mode.

2. The power management circuit of claim 1, wherein the switch further configures the level shifter to receive the first voltage at the enable terminal, when the electronic circuit transitions from the STANDBY mode to RUN mode.

3. The power management circuit of claim 2, wherein the level shifter provides the second voltage to the analog circuit module on receiving the first voltage at the enable terminal, when the electronic circuit transitions from the STANDBY mode to RUN mode.

4. The power management circuit of claim 1, wherein the master state machine further generates a handshake signal to monitor the POWER-ON, RUN and STANDBY modes of the electronic circuit.

5. The power management circuit of claim 1, wherein the master state machine controls the switch by way of the second configuration signal.

6. The power management circuit of claim 1, wherein the first logic circuit includes a XOR gate.

7. The power management circuit of claim 1 further comprising first and second power supply threshold circuits to generate the first and second configuration signals respectively, based on the POWER-ON, RUN and STANDBY modes of the electronic circuit.

8. The power management circuit of claim 1, wherein the master state machine is stored in a memory.

9. An electronic circuit, comprising:
   an analog circuit module;
   a digital circuit module;
   a master state machine for generating first and second configuration signals;
   a switch connected to a core power supply and the digital circuit module, to enable the digital circuit module for receiving a first voltage from the core power supply when the electronic circuit is in RUN and POWER-ON modes and disable the digital circuit module when the electronic circuit is in a STANDBY mode;
   a first logic circuit, connected to the master state machine, for receiving the first and second configuration signals and generating a control signal;
   a first multiplexer having a select terminal connected to the first logic circuit, a first input terminal that receives a second voltage by way of an inverted second configuration signal and a second input terminal that receives a predetermined voltage, wherein the first multiplexer generates a first output signal;
   a second multiplexer, having a select terminal connected to the first logic circuit, a first input terminal that receives the predetermined voltage, and a second input terminal that receives the second voltage by way of the inverted second configuration signal, wherein the second multiplexer generates a second output signal; and
   a level shifter having first and second input terminals for receiving the first and second output signals respectively, and an enable terminal for receiving the first voltage,
   wherein the level shifter provides the second voltage to the analog circuit module, when the electronic circuit is in the POWER-ON and RUN modes and disables the analog circuit module, when the electronic circuit is in the STANDBY mode.

10. The electronic circuit of claim 9, wherein the switch further configures the level shifter to receive the first voltage at the enable terminal, when the electronic circuit transitions from the STANDBY mode to RUN mode.

11. The electronic circuit of claim 10, wherein the level shifter provides the second voltage to the analog circuit module on receiving the first voltage at the enable terminal, when the electronic circuit transitions from the STANDBY mode to RUN mode.

12. The electronic circuit of claim 9, wherein the master state machine further generates a handshake signal to monitor the POWER-ON, RUN and STANDBY modes of the electronic circuit.

13. The electronic circuit of claim 9, wherein the master state machine controls the switch by way of the second configuration signal.

14. The electronic circuit of claim 9, wherein the first logic circuit includes a XOR gate.

15. The electronic circuit of claim 9, further comprising first and second power supply threshold circuits that generate the first and second configuration signals respectively, based on the POWER-ON, RUN and STANDBY modes of the electronic circuit.

16. The electronic circuit of claim 9, wherein the master state machine is stored in a memory.

* * * * *